United States Patent [19]
Simpson

[11] Patent Number: 6,070,153
[45] Date of Patent: May 30, 2000

[54] SYSTEM AND METHOD FOR AUTOMATICALLY INVESTING A PORTION OF A CREDIT CARD INTEREST CHARGED AMOUNT IN AN INVESTMENT ACCOUNT

[76] Inventor: Mark S. Simpson, 1 Marsh View Dr., Hilton Head Island, S.C. 29928

[21] Appl. No.: 08/976,534

[22] Filed: Nov. 21, 1997

Related U.S. Application Data

[60] Provisional application No. 60/031,890, Nov. 27, 1996.

[51] Int. Cl.[7] .............................. G06F 17/60; G06F 15/20
[52] U.S. Cl. ................................. 705/36; 705/36; 705/35; 705/39; 705/40; 235/380; 235/379
[58] Field of Search .............................. 705/36, 408, 401, 705/35; 235/379, 380

[56] References Cited

U.S. PATENT DOCUMENTS

| | | | |
|---|---|---|---|
| 4,742,457 | 5/1988 | Leon et al. | 235/379 |
| 4,751,640 | 6/1988 | Lucas et al. | 705/36 |
| 5,056,019 | 10/1991 | Schultz et al. | 235/380 |
| 5,200,889 | 4/1993 | Mori | 235/380 |
| 5,206,803 | 4/1993 | Vitagliano et al. | 705/35 |
| 5,287,268 | 2/1994 | McCarthy | 705/39 |
| 5,297,026 | 3/1994 | Hoffman | 705/35 |
| 5,787,404 | 7/1998 | Fernandez-Holmann . | |

OTHER PUBLICATIONS

Nationsbank card features a savings plan, New York Times, pD4, Jan. 7, 1993.
Get your red hot loans!, Bank Marketing, v27, n7, pp. 129–130, Jul. 1995.
Statements to the Congress: Board of Governors, Rederal Reserve Bulletin, v80, n4, pp. 296–3001, Apr. 1994.
Smart money hesitates before Fidelity offer, Wall Street Journal, pB, 4G:3, May 27, 1994.
New Credit Card Helps Users Purchase Firm's Funds, *The Wall Street Journal*, May 27, 1994.
Customers Able to Borrow Up to 40% of the Balances in Retirement Accounts, *The Wall Street Journal*, Jun. 24, 1996.

*Primary Examiner*—James P. Trammell
*Assistant Examiner*—Nga B. Nguyen
*Attorney, Agent, or Firm*—Clarence J. Fleming

[57] ABSTRACT

A system and methods for automatically investing, a portion of interest charged amount paid by the card issuer or the cardholder, on a credit card account, to an individual retirement account, taxpayer relief act of 1997 IRA, "Roth Act" or "Super IRA", college education IRA or spousal IRA (herein, collectively, "IRA"), college savings account, 401 (K) plan (with or without linkage to a company expense account credit card), dividend reinvestment program (in stock of the card issuing company or otherwise) or other investment feature.

9 Claims, 5 Drawing Sheets

Phase 1

Phase 1 (Continued)

Phase 2

Phase 3

FIGURE 3 (CONTINUED)
Phase 3 (Continued)

6D. Alternative Method #4:
The cardholder determines in advance to be billed for and pay a monthly amount to be deposited into the Investment Account. This is accomplished at the time the amount is paid. Cardholder funded 6E. Alternative Method #5:
A combination of two or more of the methods described in Alternative Methods 1, 2, 3 and 4

SYSTEM AND METHOD FOR AUTOMATICALLY INVESTING A PORTION OF A CREDIT CARD INTEREST CHARGED AMOUNT IN AN INVESTMENT ACCOUNT

This Application claims the benefit of the filing date of provisional application, Ser. No. 60/031,890, filed Nov. 27, 1996.

BACKGROUND OF INVENTION

Credit cards which offer rewards or rebates based upon usage of the credit facility are common. Credit card firms such as Visa and MasterCard, automobile manufacturers, rental car companies, department stores, long distance telephone companies, financial institutions and other organizations have offered a number of different programs for promoting purchases of goods and services. Some offer free airline tickets while others offer credit toward the purchase of gasoline, automobiles or movie rentals.

The present invention allows credit card issuers to promote purchases of goods and services using the credit facility while at the same time encouraging individuals to save and invest for retirement the invention offers multiple investing methods to achieve that goal.

In the current environment of (1) high credit card use, and (2) low savings and inadequate planning for retirement, a system which provides incentives to credit card users to begin saving for retirement or college, or increase or accelerate retirement or college savings is an idea whose time has come. The use of the invention described herein will introduce the spending side of the population to the saving side.

The present invention is particularly timely at a time when social security payments from the Federal government are no longer assured and, in the long term, many corporations are discontinuing or phasing out their long-standing pension programs. Similarly, the cost of a college education has never been higher and if current estimates are to be believed, will continue to rise dramatically.

The present invention offers individuals the opportunity to "spend their way to retirement" or to spend their way to a quality college education for their children.

SUMMARY OF THE INVENTION

The present invention relates to a credit card product which is used to fund an automatic Individual Retirement Account, Taxpayer Relief Act of 1997 or "Roth Act" or "Super IRA" (IRA), Spousal IRA, College Education IRA or College Savings Account, 401(K) Profit Sharing Plan, SEP or Dividend Reinvestment Plan (in stock of the card issuer or otherwise) or other investment account (hereinafter, collectively the "Investment Account").

A portion of either the amount charged to the credit card for the purchase of goods and services or a portion of the interest paid on the outstanding balance of the credit card—or a combination thereof—would be invested each month in the Investment Account. These amounts would be funded by the card issuer. An alternative or additional approach would be to include a funding method for the Investment Account whereby a set amount or set percentage of each transaction amount is charged to the cardholder and invested in the Investment Account. Thus, at the time of a $100.00 purchase, either $10.00 (for example) is added to the transaction amount or 5%, or $5.00 (for example) is added to the transaction record, is charged to the cardholder's credit account and transferred (when paid, most probably) to the cardholder's Investment Account. This feature would facilitate concepts such as "invest each time you spend" or "invest 5% of your spending". This method could quite logically be added to the other funding methods, thus providing multiple ways to save for retirement, would provide a method to shift the burden of funding the Investment Account to the cardholder/investor and would increase the performance of the system of the present invention.

The Investment Account could have a vesting schedule which would apply to funds not contributed by the cardholder. The credit card issuer could retain the right to invade the Investment Account in the event of default in payment by the borrower. It is also possible that the issuer could retain the invasion right for the life of the credit card account. The Investment Account could then be restricted such that it could not be transferred until the vesting period had run.

The cardholder/investor could also make optional additional investments to the Investment Account—which would not be subject to a vesting schedule or any offset for bad credit—up to the government established IRA or 401(K) Plan investment ceilings. The IRA and 401(K) Plan accounts would be the same—following expiration of a vesting schedule—as existing IRA and 401(K) Plan investment accounts. This might require a bifurcation of an Investment Account in the event a vesting schedule is used.

The program could very easily be adapted to a corporate format for expense account credit cards with corresponding individual 401(k) or SEP accounts established.

A brief summary of how an issuing company would set up and operate the present invention:

a) The Issuing Company would solicit applications through a marketing program for a credit card account and Investment Account.

b) Applicants would complete application documentation for both accounts and return them to the Issuing Company.

c) Separate account records would be set up for the credit card accounts and corresponding Investment Accounts. These data bases would be linked by account numbers and cross-referenced in that fashion.

d) Account management systems would be developed and put into place to handle the payment status of the credit card facilities and the transfer of funds directly to the Investment Accounts—upon billing for payment for use-related Investment Account transfers, upon payment for interest payment-based Investment Account transfers, and upon payment for optional per transaction or automatically billed amounts.

A general example of how the present invention may be used is as follows:

The cardholder charges product and service purchases on the credit card for a given month in the amount of $1,500.00 and at the end of that month there exists a balance of $2,500.00. A designated portion of the amount charged—for this example we will use 1.5% or $22.50—is deposited into the individual's IRA or Investment Account. A Finance Charge of 18% per year (1.5% per month) is assessed against the Balance. The Finance Charge for that month would equal $37.50. A designated portion of the Finance Charge—in this example, one-half of the Finance Charge (0.50% per month or 6% annually or $18.75) would be rebated or deposited into a segregated personal Investment Account. Under this example, and assuming the outstanding monthly balance remained constant at year end, this individual's Investment Account would have a balance of $495.00 at year end. The cardholder/investor could then make monthly or lump sum year end contribution(s) totaling $1,505.00 (thereby reaching the government limit of $2,000.00 per year/wage earner).

An alternative or additional funding method would be the automatic addition to each transaction amount—or a lump sum addition at the end of the monthly billing cycle for all transactions for that month—of a set amount or set percentage of the transaction per transaction.

Thus, to the above example, are added the following assumptions: that the $1,500.00 per month charges are continued and that amount represents, on average, ten (10) transactions. At a $10.00 per transaction level of cardholder contribution, this adds $100.00 per month to the Investment Account. At a 5% per transaction amount level of cardholder contribution, this adds $75.00 per month. When used in conjunction with the other issuer-paid contributions, one or both of these funding methods will greatly accelerate the funding of the Investment Account and could be used to partially or totally shift the burden for Investment Account funding from the card issuer to the cardholder/investor.

If the credit card is issued by a company which also provides Investment Account services, the issuer could charge a somewhat higher fee for account management services than in conventional Investment Accounts, to offset the possible lower balances (at least initially) of these accounts.

Another benefit of issuance of the credit facility by a mutual fund or investment company would be the joint marketing benefits—the credit facility could be used as an added benefit for investors—and the savings component would be attractive to all credit card users. Also, profiting from both aspects of the transaction would allow the mutual fund or investment company card issuer to adjust all of the aspects of the transactions to find the most profitable mix.

DESCRIPTION OF A PREFERRED EMBODIMENT

Figure 1:
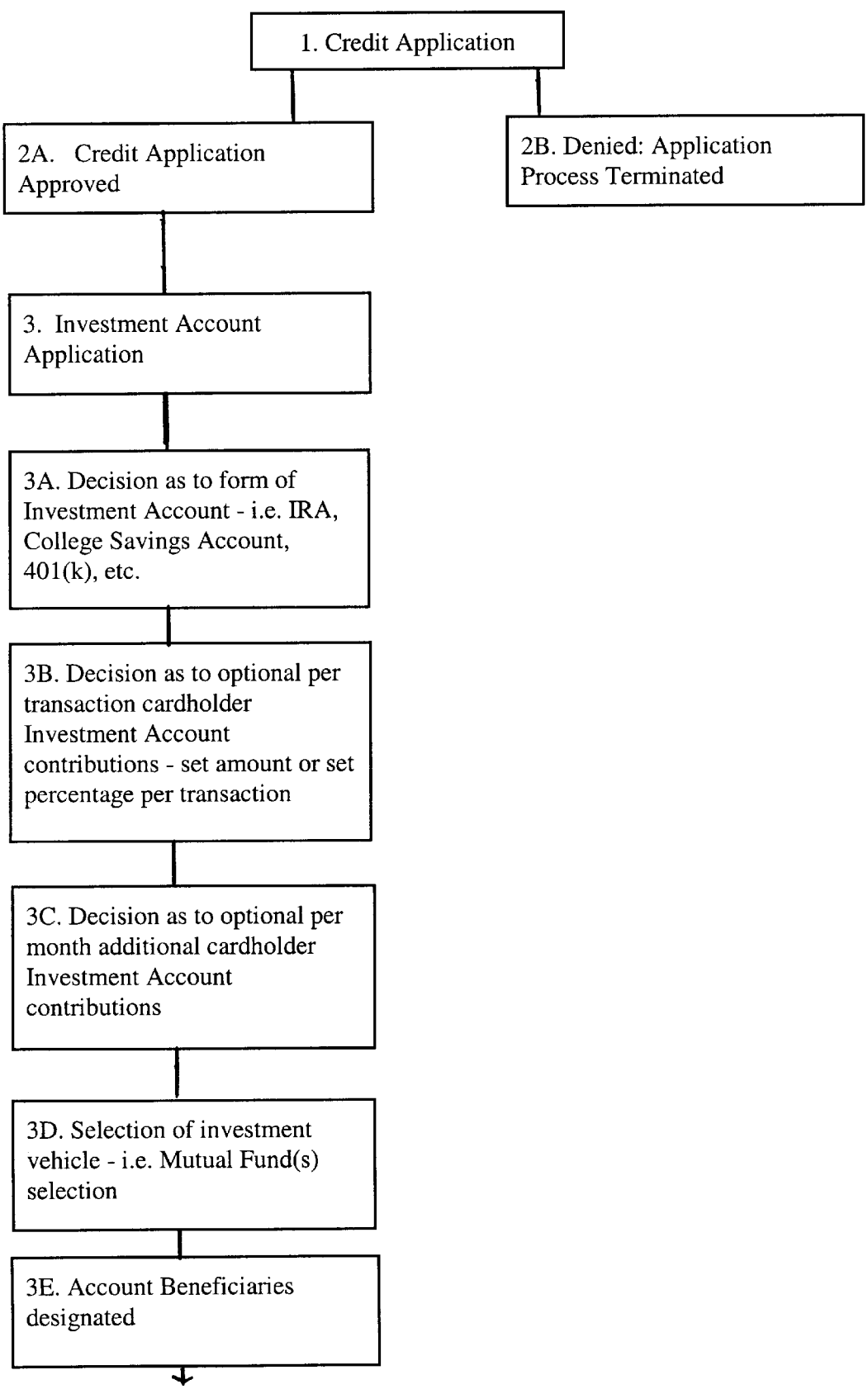
FIG. 1 is an operational flow chart of the credit application phase of the system and method of the invention.
Figure 1:
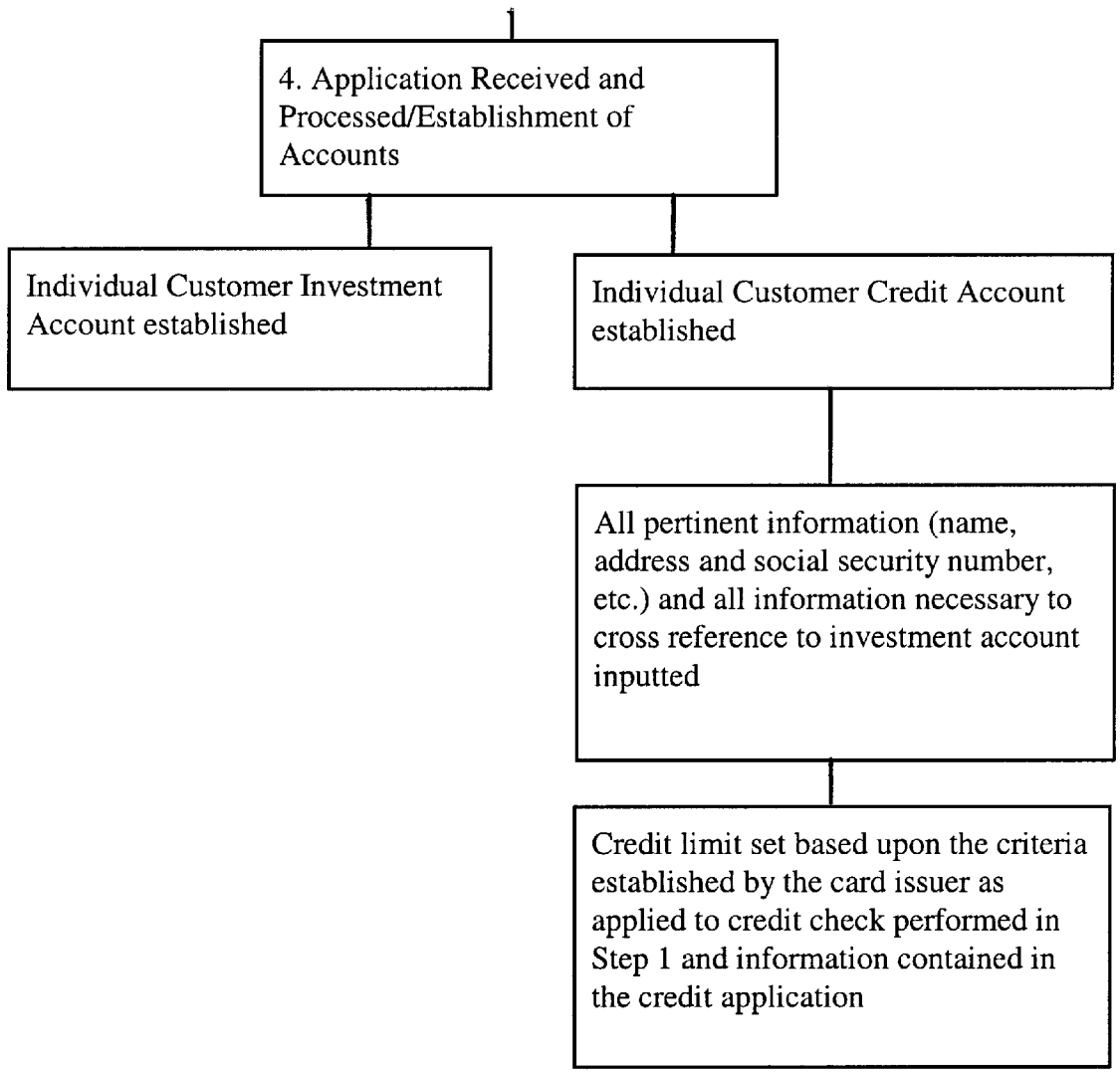
Figure 2:
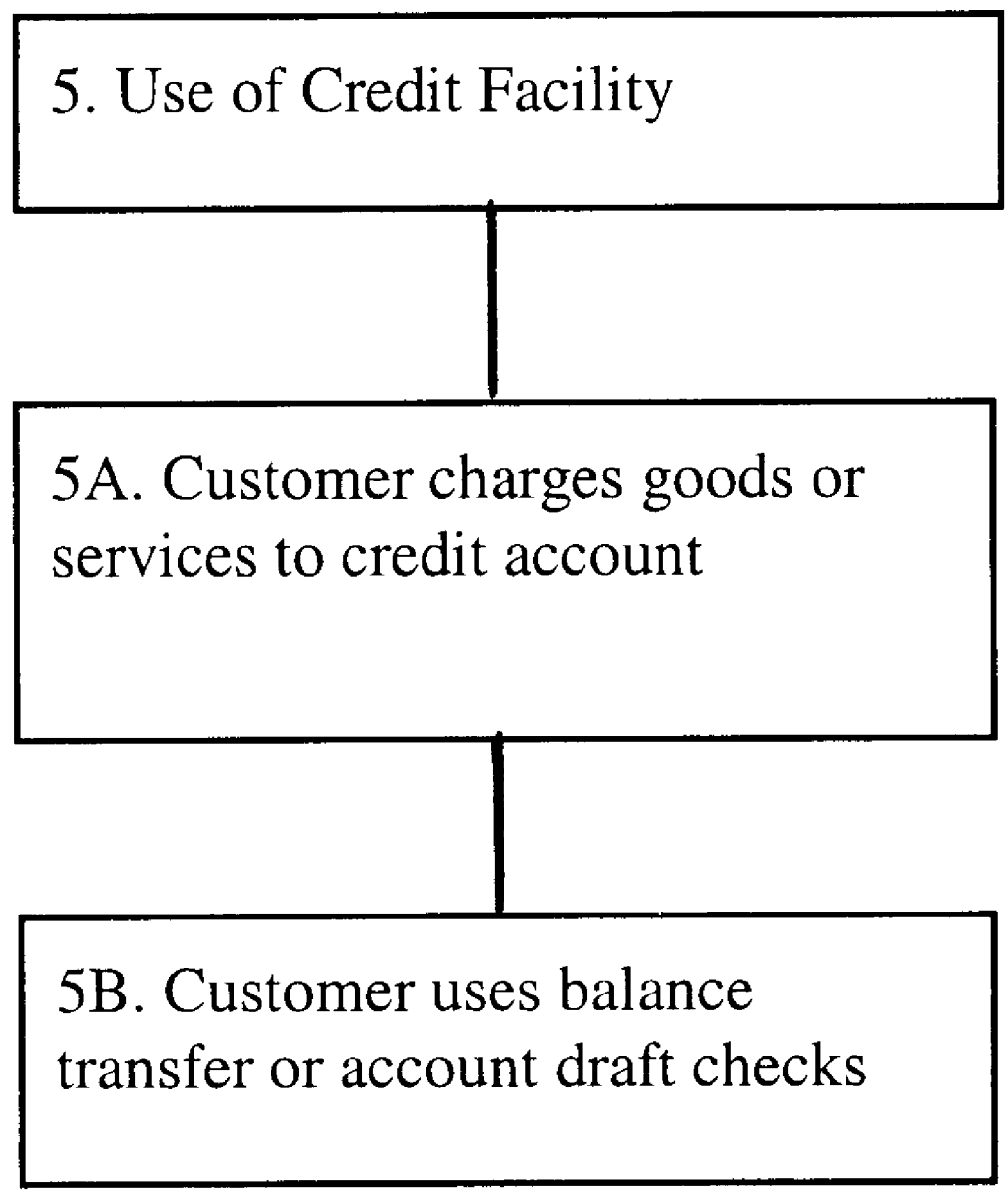
FIG. 2 is an operational flow chart of the credit card use phase of the system and method of the invention.
Figure 3:
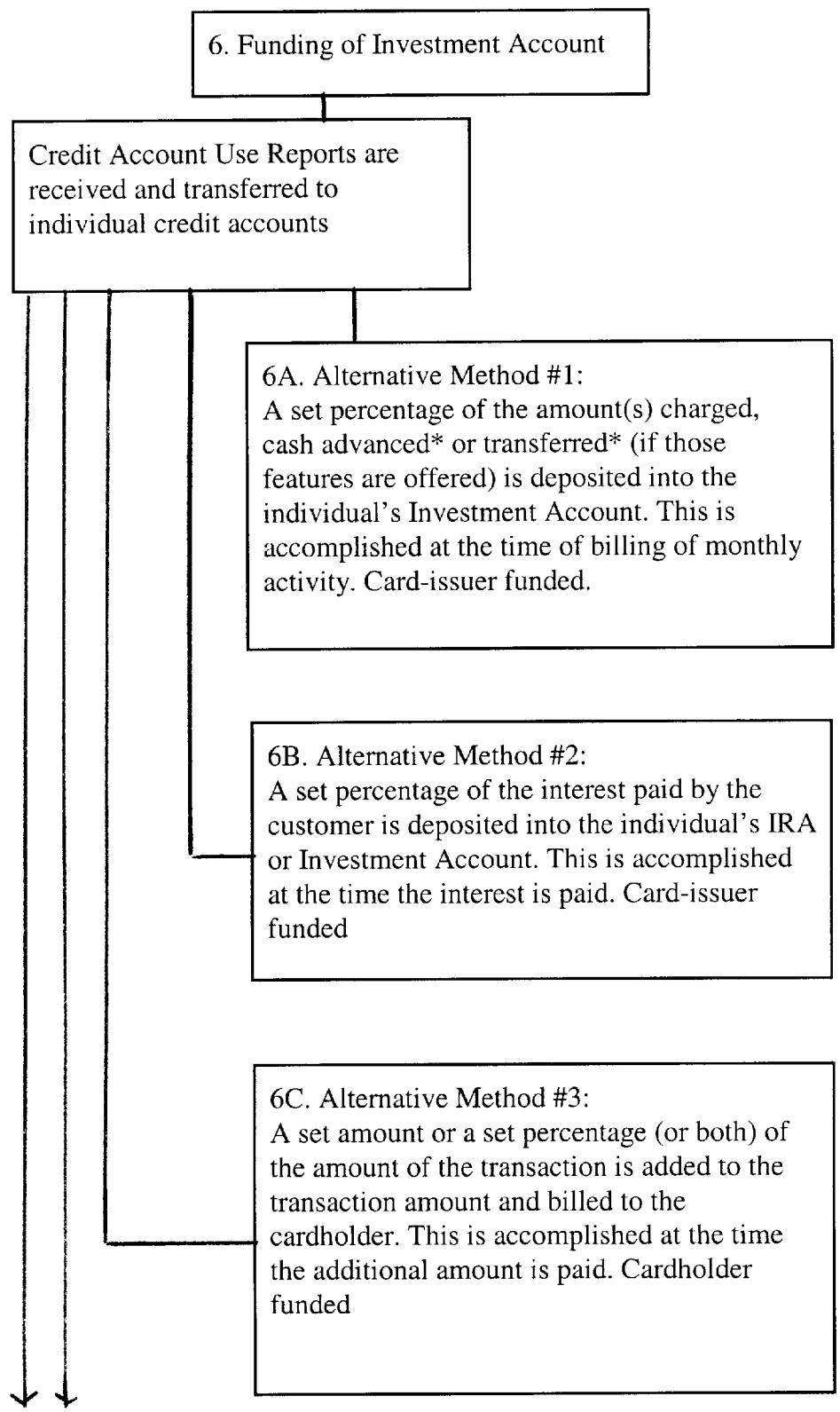
FIG. 3 is an operational flow chart of the investment account funding phase of the system and method of the invention.

Referring to FIGS. 1–3, the operation of the system and method of the invention is as follows:

Step 1—Credit Facility Application.

A customer applies for a credit card account by filling out and returning a Credit Application. The Credit Application will contain all customary required disclosures such as finance charges, fees, etc.

Step 2—Approval or Denial of Credit Application.

2A. If approved, the customer is sent additional information about the credit facility including credit limit, a credit card or cards, investment account application materials and more information about the Investment Account.

2B. If denied, the credit application process is terminated, but the customer is still sent information about IRA or other Investment Accounts and offered the opportunity to invest if desired.

Step 3—Investment Account Application.

Simultaneously with the credit facility application, upon credit approval and acceptance by the Issuer, the cardholder/investor fills out an IRA Application and Custodial Agreement (or similar documentation for other types of Investment Accounts) which contain the agreement on behalf of the customer to the custodial relationship, and to any "set-off" or account "invasion" rights of the issuer for bad debt.

3A. The Application would require the cardholder/investor to state whether the IRA is to be a regular, Spousal or Educational IRA, or what other form the Investment Account is to take.

3B. The cardholder/investor designates set optional amounts or percentage per transaction of the cardholder's Investment Account contribution.

3C. The Application would also offer the cardholder/investor the opportunity to establish an automatic investment program—in addition to the issuer funded contributions—and to receive applications for additional accounts upon request.

3D. The Investment Account Application would also require the cardholder/investor to select an investment fund (this assumes that the issuer would offer fund alternatives, i.e. Blue Chip Stock Fund, Corporate or Municipal Bond Fund, etc.) and to agree to any applicable vesting schedule and optional additional monthly investments.

3E. The cardholder/investor will designate primary and residual beneficiaries.

Step 4. The Investment Account Application is reviewed by the issuer and processed. An individual cardholder credit account is established. All pertinent information (name, address and social security number, etc.) and all information necessary to cross reference to the Investment Account is inputted. A credit limit is set based upon the criteria established by the card issuer as applied to the credit check performed in Step 1 and information contained in the credit application. The individual cardholder/investor's Investment Account with all offered and selected funding mechanisms in place is then established.

Step 5—Use of Credit Facility.

5A. Upon receipt of the credit card the cardholder can immediately charge goods and services to the credit account.

5B. Courtesy balance transfers or account draft checks (with or without a service charge) would also be provided for account access.

Step 6—Funding of Investment Account.

The Investment Account can be funded by one or more or all of the following Alternative Funding Methods:

6A. Alternative Funding Method #1: A portion of the amounts charged—or the amounts charged and transferred—is deposited into the individual's IRA or Investment Account. This method is funded by the Card—Issuer; or 6B. Alternative Funding Method #2: A portion of the interest paid by the customer, on a monthly basis, is deposited into the individual's IRA or Investment Account. This method is funded by the Card—Issuer.

It might well result that a combination of both of the mechanisms contained in Alternative Funding Methods 1 and 2 would be the most successful approach as many users of credit cards for convenience do not carry a balance and therefore do not pay any interest.

6C. Alternative Funding Method #3: A set amount or a set percentage (or both) of the amount of the transaction is added to the transaction amount and billed to the cardholder. This is accomplished at the time the additional amounts are paid. This method is funded by the cardholder.

6D. Alternative Funding Method #4: The cardholder determines in advance to be billed for and pay a monthly (or other period) amount to be deposited into the Investment Account. This is accomplished at the time the monthly amount is paid. This method is funded by the cardholder.

6E. Alternative Funding Method #5: A combination of two or more, or all, of the methods described in Alternative Funding Methods 1, 2, 3 and 4.

It might well result that a combination of one or more—or all—of the alternative mechanisms would be the most successful approach as many users of credit cards for convenience do not carry a balance and therefore do not pay any interest and many individuals will seek some form of automatic or periodic self-funded investment in order to reach the annual maximum contribution of $2,000.00 per individual for an IRA or $500.00 per child for an Educational IRA.

On a program of this scale, tax implications might arise making the interest portion mechanism more attractive. Also, profitability issues will differ depending upon the issuer, its market position, and other factors; however, for our purposes, we will use a hybrid approach.

Therefore

As a cardholder/investor charges goods or services, or transfers a balance, a portion of those amounts—for this example we will use 1.5%—is deposited into the individual's IRA or Investment Account. The monthly credit account statement will include an IRA or Investment Account Statement showing the accounts' status.

Upon the payment by the cardholder/investor of the minimum payment as described in the credit account statement or whatever amount the cardholder/investor chooses to pay, a portion of which includes interest or finance charges, a portion of the interest charge (including or not including fees)—for this example we will use 50% of the interest charge paid each month—is deposited into the individual's IRA or Investment Account. This amount will be posted on the joint statement for the following month, as will the credit account payment.

Upon the payment by the cardholder/investor of optional periodic or automatic additional amounts, they are deposited into the individual's IRA or Investment Account. This amount will be posted on the joint statement for the following month as will the credit account payment.

Each month, the cardholder/investor will be able to evaluate activity in both accounts.

At the end of the calendar year, the cardholder/investor will be notified that funds may still be directly deposited into the IRA or Investment Account according to the time limits (i.e., April 15th of the following year for IRA's) and amount limits (i.e. $2,000.00 for Regular or Spousal IRA's $500.00 per child for Educational IRA's) established by the Federal Government.

The cardholder/investor can also deposit funds directly into the Investment Account by completing the deposit or investment form attached to each monthly Joint Account Statement.

The Investment Account and Credit Account—although they interact—will always be separate and distinct accounts for each individual. They may be held and/or serviced by different entities or the same entity. In the event that a cardholder/investor wishes to close either an Investment Account or a Credit Account and retain the other account, that could be accomplished—subject to vesting considerations.

Service or Custodial Fees would be charged by the Investment Account Custodian—depending upon the type and balance of the account. Fees might be waived or reduced in the event a certain account balance or a certain level of credit facility use is achieved.

Service fees would also be charged on the credit facility.

As many fund objective options as are feasible for Investment Account vehicles should be offered. This will involve a balancing of marketing concerns vs. cost concerns.

401(K) or SEP plans could offer cardholder/investor's Investment Accounts which hold the stock of the issuing company—i.e. the McDonald's plan would include IRA's and Investment Accounts containing McDonald's common stock.

BRIEF DESCRIPTION OF HOW AN ISSUING COMPANY WOULD SET UP AND OPERATE THE INVENTION.

a) The Issuing Company would solicit applications through a marketing program for a credit card account facility and Investment Account.

b) Applicants would complete application documentation for both accounts and return them to the Issuing Company.

c) Separate account records would be set up for the credit card accounts and corresponding Investment Accounts. These data bases would be linked by account numbers and cross-referenced in that fashion.

d) Account management systems would be developed and put into place to handle the payment status of the credit card facilities and the transfer of funds directly to the Investment Accounts—upon billing for payment for use-related Investment Account transfers, upon payment for interest payment-based or cardholder contribution Investment Account transfers and upon payment for optional per transaction or automatically monthly billed amounts.

While the present invention has been described herein by the preferred embodiment, it will be understood by those skilled in the art that various changes may be made and added to the process. These changes and alternatives are considered to be within the spirit and scope of the present invention. While the present invention has been illustrated by description of an embodiment and while the illustrative embodiment has been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and method and illustrative example shown and described. Accordingly, departures may be made from such details without departing from he spirit or scope of the applicant's general inventive concept.

What is claimed is:

1. A method employed by an offering entity such as a credit card issuer, mutual fund or investment company or frequent flyer program sponsor, for using a computer having a memory with associated data processing means to create and operate credit and investment accounts for individual cardholder/investors and to provide for automatic investment into the investment account based upon a set percentage of interest charged comprising:

(a) selecting a percentage of interest charged and entering and storing the selected percentage into the memory of the computer;

(b) each time the cardholder/investor makes a purchase or processes a cash advance using a credit card of the offering entity, entering and storing a record of the purchase or advance in the computer memory, including the date and the amount of the purchase or advance;

(c) automatically calculating, by using the data processing means of the computer, a sum of total purchases and/or advances made by the cardholder/investor and the amount of interest charged to the cardholder/investor during a preselected period based on said sum; and (d) under the control of the computer, automatically calculating an amount to be contributed by the offering entity to the cardholder/investor's investment account by applying said selected percentage to the amount of interest charged to the cardholder/investor to establish an investment amount and automatically investing said investment amount on behalf of and for the credit of the cardholder/investor into the investment account and automatically issuing a statement to the cardholder/investor indicating said invested amount the balance and activity in the credit account and the balance and activity in the investment account.

2. The method according to claim 1 wherein said investment account is an individual retirement account.

3. A system used by a credit card issuer, for promoting retirement savings for a credit cardholder/investor while promoting purchases by the credit cardholder/investor of products or services from or through the credit card issuer, comprising of:

(a) central computer means with associated data storage means, data processing means and data input means;

(b) the data processing means, including means to establish a predetermined percentage of interest charged to the credit cardholder/investor;

(c) the central computer means including purchase tabulating means for automatically receiving and entering into the data storage means records of purchases and advances made by the credit cardholder/investor during a first preselected period, and for calculating a sum of total purchases and advances made during such first preselected period;

(d) the central computer means, including means for receiving and entering into the data storage means the amount of interest charged to the cardholder/investor for a second preselected period;

(e) the central computer means automatically calculating an investment amount to be transferred to an investment account based upon the amount of interest charged to the credit cardholder/investor by applying said predetermined percentage of interest to said amount of interest; and (f) the central computer means including means for automatically transferring said investment amount to the investment account and for automatically issuing to the credit cardholder/investor a statement showing said investment amount.

4. The system according to claim 3 wherein said investment account is an individual retirement account.

5. A method of using a computer having a memory and associated data processing means for automatically funding an investment account in response to transactions using a credit card issued by an issuing facility comprising:

(a) using the computer to establish in the computer memory a credit account and an investment account for a cardholder;

(b) using the computer memory to store in the credit account information representative of a first amount charged by the cardholder using the credit card;

(c) using the data processing means of the computer to determine an interest amount which is based on said first amount;

(d) using the data processing means of the computer to determine a second amount which is a percentage of said interest amount;

(e) using the computer to establish a funding account of the issuing facility; and (f) using the data processing means of the computer for periodically transferring information from said funding account to said investment account which is representative of said second amount.

6. The method according to claim 5 wherein said investment account is an individual retirement account.

7. The method of using a computer having a memory and data processing means to provide for automatic investing in response to use of a credit card issued by an issuing entity comprising:

(a) using the computer memory to establish a credit account and an investment account for a cardholder who is issued a credit card by the issuing entity;

(b) using the computer memory to establish a funding account of the issuing entity;

(c) using the data processing means of the computer to determine a first amount which is representative of charges incurred by use of the credit card by the cardholder during a predetermined period and storing information representative of that amount in the computer memory;

(d) using the data processing means of the computer to determine an interest amount based on said first amount and storing information representative of the interest amount in the computer memory;

(e) using the data processing means of the computer to determine an investment amount which is a percentage of said interest amount; and (f) using the data processing means of the computer for periodically transferring information representative of said investment amount from funding account to said investment account.

8. The method of claim 7 wherein the information representative of said investment amount is transferred to said investment account in response to payment of said first interest amount by the cardholder.

9. The method of funding an investment account by a credit card issuer for the benefit of a credit cardholder in response to use by the cardholder of a credit card issued by the credit card issuer comprising the steps of:

(a) establishing a credit account and an investment account by the credit card issuer for the benefit of the credit cardholder;

(b) establishing a funding account of the credit card issuer;

(c) issuing a credit card by the credit card issuer to the credit cardholder;

(d) determining a first amount which is representative of charges incurred by use of the credit card by the cardholder during a predetermined period;

(e) determining an interest amount based on said first amount;

(f) determining an investment amount which is a percentage of said interest amount; and (g) periodically transferring information representative of said investment amount from said finding account to said investment account.

* * * * *